MULTIPLEX SIGNAL DEMODULATOR

Filed Dec. 2, 1960 3 Sheets-Sheet 1

INVENTORS.
FERNANDO BIAGI
RICHARD A. MORROW
MARTIN MASONSON
BY Alfred C. Hill
AGENT INVENTORS.
FERNANDO BIAGI
RICHARD A. MORROW
MARTIN MASONSON
BY Alfred C. Hill
AGENT March 10, 1964 F. BIAGI ETAL 3,124,652

MULTIPLEX SIGNAL DEMODULATOR

Filed Dec. 2, 1960 3 Sheets-Sheet 3

INVENTORS.
FERNANDO BIAGI
RICHARD A. MORROW
BY MARTIN MASONSON
Alfred C. Hill
AGENT United States Patent Office 3,124,652
Patented Mar. 10, 1964

3,124,652
MULTIPLEX SIGNAL DEMODULATOR

Fernando Biagi, Wayne, Richard A. Morrow, Clifton, and Martin Masonson, Nutley, N.J., assignors to International Telephone and Telegraph Corporation, Nutley, N.J., a corporation of Maryland Filed Dec. 2, 1960, Ser. No. 73,454
20 Claims. (Cl. 179—15)

This invention relates to multiplex communication systems and more particularly to a demodulator to separate and demodulate the channel signals of an arbitrary pulse time modulation (PTM) time division multiplex signal.

In communication systems of the multiplex type employing PTM type channel signals, such as pulse position modulation (PPM) pulse, duration modulation (PDM) and pulse frequency modulation (PFM), it is the practice to transmit a synchronizing signal identifying a predetermined frame period along with a predetermined number of channel signals contained in the predetermined frame period. At the receiver the synchronizing signal is detected and gate pulses are produced having a frame period equal to the frame period of the synchronizing signal. The gate pulses are applied to a distributor, such as a tapped delay line, to provide a plurality of trains of channel gate pulses appropriately timed to separate the channel signals from the received multiplex pulse train to enable the demodulation of the separated channel signals. Thus, in the prior art arrangement the number of channel pulses and the frame period are known and the demodulator is accordingly arranged to separate and demodulate the channel signals of the received multiplex pulse train.

An object of this invention is to provide a demodulator for PTM time division multiplex communication systems which does not require prior knowledge of the of the frame period and/or the number of channel signals.

Another object of this invention is the provision of a PTM time division multiplex communication system incorporating at the receiver thereof the demodulator of this invention to provide secret communication between a transmitter and the receiver by arbitrarily changing the number of channel signals and/or frame period being transmitted.

In accordance with the principles of this invention the arbitrary PTM time division multiplex pulse train having a variable number of channel signals and a variable frame period is applied to a first device to determine the frame period. Simultaneously the multiplex pulse train is applied to a second device to count the number of channel signals. A third device divides the output signals from the first device by the output signal from the second device to produce a train of equally spaced channel gate pulses. The equally spaced channel gate pulses are applied along with the multiplex pulse train to a circuit arrangement whereby channel signal separation and demodulation is accomplished. The above components producing the channel gate pulses may be binary in nature, analogue in nature or an admixture thereof.

The above-mentioned and other features and objects of this invention will become more apparent by reference to the following description taken in conjunction with the accompanying drawings, in which.

Figure 1:
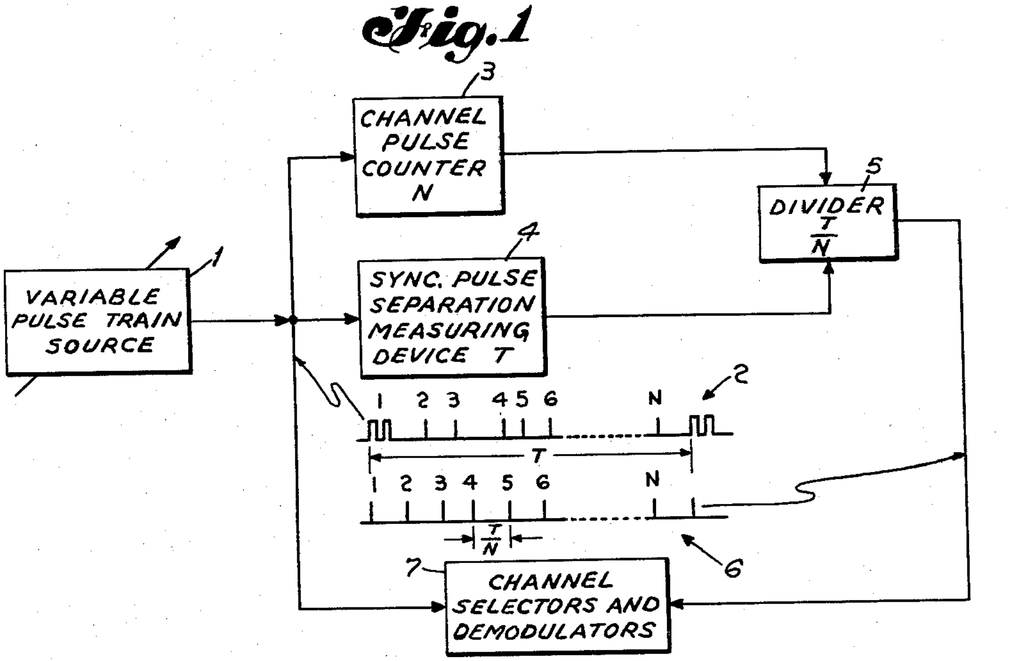
FIG. 1 is a schematic diagram in block form of a PTM time division multiplex demodulator in accordance with the principles of this invention.

Referring to FIG. 1, there is illustrated a demodulator in accordance with the principles of this invention which operates upon an arbitrary multiplex signal of the PTM time division type, such as applied from source 1, having a variable number of channel pulses and a variable frame period to generate the necessary reference or channel gate pulses to bring about the channel signal selection and demodulation. Source 1 may be the front end of a receiver receiving from a distant transmitter or transmitters the arbitrary multiplex signals. The variation of the parameters of frame period and channel signal number may be predeterminedly arranged to provide secret communication between a transmitter and receiver to prevent eavesdropping upon the conversations carried on between the two terminal points, or these parameters may be variable since the demodulator and its associated receiver may be employed to monitor or receive intelligence from a number of different transmitters each of which may have a different frame period and/or different number of channel signals in this frame period.

To enable the channel signal separation and demodulation, it is well known that it is necessary to provide in each frame period a train of pulses which are equally spaced one from the other to act as a reference or gate pulse for the signal channels present in the frame period. In accordance with the present invention, an arbitrary PTM time division multiplex signal, such as illustrated in curve 2, is coupled from source 1 to channel pulse counter 3 and sync pulse separation measuring device 4. Counter 3 counts the number of channel pulses present in a frame period while measuring device 4 measures the time interval between adjacent synchronizing pulses, the frame period identifying means. The counter 3 and measuring device 4 may be analogue or digital in nature or they may be admixed to provide an output signal proportional to the frame period in the case of device 4 and the number of channel signals in the case of counter 3. These resulting output signals are coupled to a divider 5. Divider 5 operates in response to the output signals of counter 3 and measuring device 4 to divide the signal from device 4 by the signal of device 3 to provide a train of equally spaced reference or channel gate pulses for each frame period as indicated by curve 6. Divider 5 may be of the type that performs the indicated division or may be of the type that will respond to the output of counter 3 to select an appropriate circuit to provide a number of channel gate pulses equal to the number of counted channel signals present in the frame period. The resultant output signal of divider 5 operates upon the received multiplex signal in channel selector and demodulator 7 to appropriately couple the received channel signals to the proper signal channel and to accomplish the desired demodulation in a conventional manner.

Figure 2:
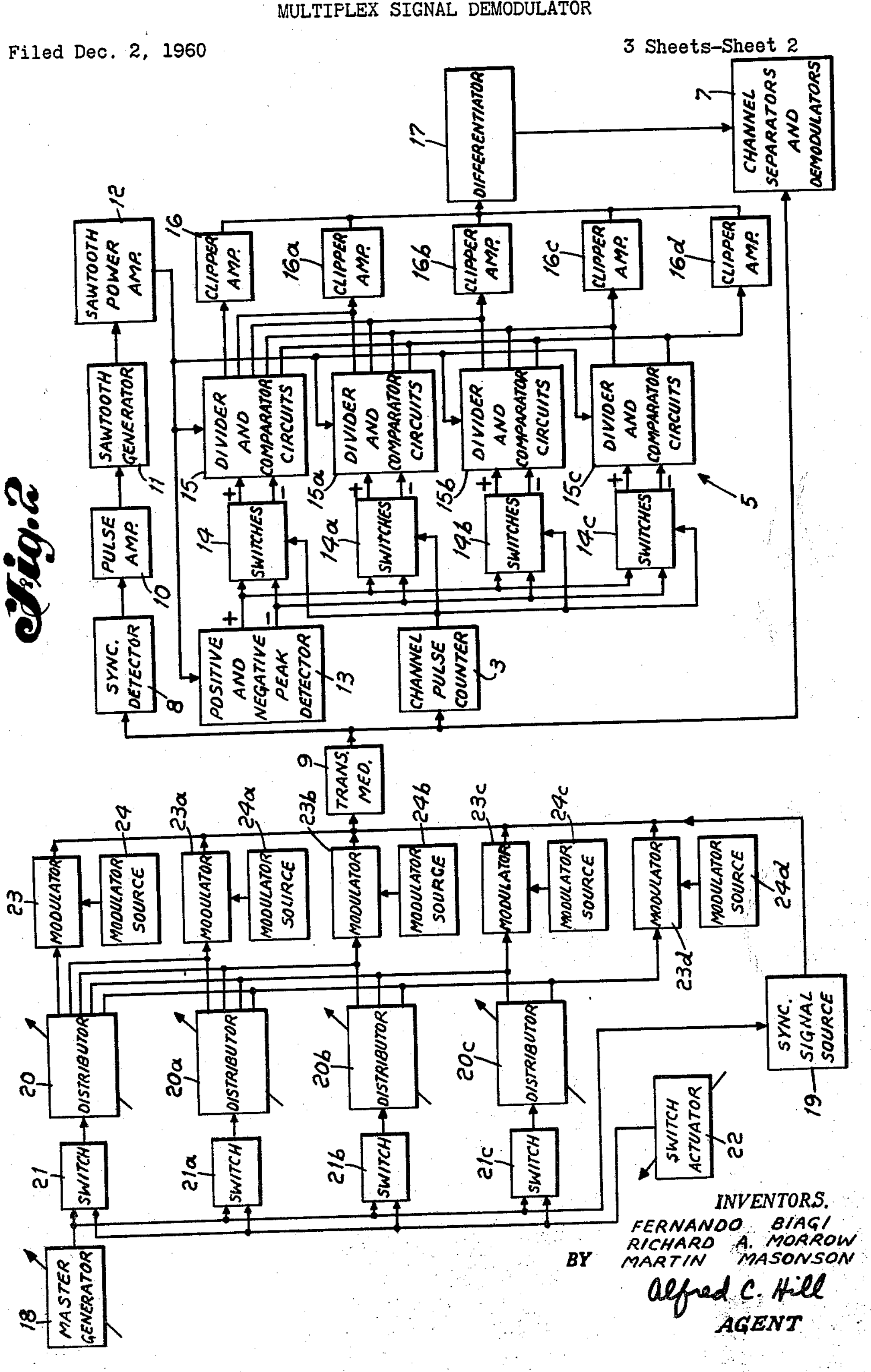
FIG. 2 is a schematic diagram in block form of a PTM time division multiplex communication system incorporating the demodulator of this invention.

Referring to FIG. 2, the demodulator of FIG. 1 is illustrated more specifically as including in its analogue form a synchronizing signal detector 8 which may take the form of an integrating arrangement to integrate the signals present in the multiplex signal received from transmission medium 9. The synchronizing signal in this arrangement which may be in the form of a distinct pulse or pulse group will contain more area than the channel signals and will thus have a greater amplitude than the channel signals. The synchronizing signals then can be separated by amplitude selection. The output of detector 8 is coupled through amplifier 10 to a sawtooth generator 11 for triggering the action thereof to provide a sawtooth signal having an amplitude proportional to the time interval between adjacent synchronizing pulses, in other words, proportional to the frame period. The resultant output of generator 11 is a sawtooth signal symmetrically disposed about a zero axis, thereby providing equal positive and negative amplitudes for the sawtooth signal. The output of generator 11 is coupled to amplifier 12 to raise the level thereof to a selected value both in the positive and negative direction for application to positive and negative peak detector 13 to provide a voltage proportional to the positive peak of the sawtooth signal and a negative peak of the sawtooth signal. The resultant positive and negative signal is coupled to divider 5, one form of which is illustrated as including switches 14 and divider and comparator circuits 15. For purposes of explanation only four channel signals are considered but it is well within the skill of those working in the field to extend the teachings present herein to systems having more than four channels.

The output of transmission medium 9 is also coupled to counter 3 which may take the form of a binary counter or a storage type analogue counter which produces an output signal proportional to the number of channels present in a frame period. The resultant output signal is coupled to divider 5 and more specifically to switches 14 to control the route the output signals of detector 13 will follow, in other words, to which of circuits 15 will the output signal of detector 13 be applied. The particular circuit 15 selected as determined by the number of channel signals counted is prearranged to carry out the appropriate division of the output signals of detector 13. Switches 14 associated with an analogue version of counter 3 could be a device associated with a bias arrangement to prevent the passage of the output signal of detector 13 to the appropriate one of circuits 15 and no other one of circuits 15. This could be accomplished by appropriately biasing a pair of diodes so that one diode will at a predetermined level conduct to couple the output of detector 13 to the input of the appropriate one of circuits 15. The second diode remains nonconducting until some increase in amplitude due to an increased count will cause the second diode to conduct to thereby effectively remove the output of detector 13 from the previously selected one of circuits 15. Thus, if four channels were detected in counter 3, switch 14 would be operated to pass the output of detector 13 to divider and comparator circuits 15 to operate in conjunction with the output of amplifier 12 to divide the generated sawtooth signal into five equal time segments for application to amplifier clippers 16. Amplifier clippers 16 generate square wave pulses having a duration and polarity determined by the equal time segments at the output of circuits 15.

The square wave outputs of amplifier clippers 16 are coupled to a common differentiator 17 to operate upon the resultant square wave pulses to produce the channel signals equally spaced one from the other for application to channel separator and demodulator 7 for operation upon the multiplex signal at the output of transmission medium 9 to recover the intelligence carried by the channel signals for application to the appropriate signal channel.

FIG. 2 further illustrates, in addition to the more specific arrangement of the demodulator of this invention, one form in which the source 1 of FIG. 2 can assume. A master generator 18 generates a signal whose repetition rate or period controls the frame period of the transmitted multiplex signal. The output of generator 18 is coupled to synchronizing signal source 19 to generate the distinctive synchronizing signals to define the transmitted frame period. The output of generator 18 also may be coupled to any one of a series of distributors 20 by means of switches 21 activated from device 22 which may be a manually operated device to appropriately select the number of channels desired to be sent in a given frame period or may be an automatically programmed device to change the number of channel signals transmitted in accordance with a prescribed program for secret communication. Switches 21 in this instance would necessarily be a coincidence device responding only when the appropriate voltage or signal is coupled thereto from actuator 22 to open the selected one of switches 21 for coupling the output of generator 18 to the selected one of distributors 20. The output or channel signals of each of distributors 20 are coupled to the appropriate one of PTM modulators 23 to be modulated by signals from modulation sources 24. The number of modulators 23 being employed will depend upon which of distributors 20 is selected by actuator 22. The resultant PTM channel signals and the output of source 19 are combined to form a time division multiplex signal for application to transmission medium 9 for propagation to the demodulator of this invention. Transmission medium 9 may be in the form of wire, cable or radio.

Figure 3:
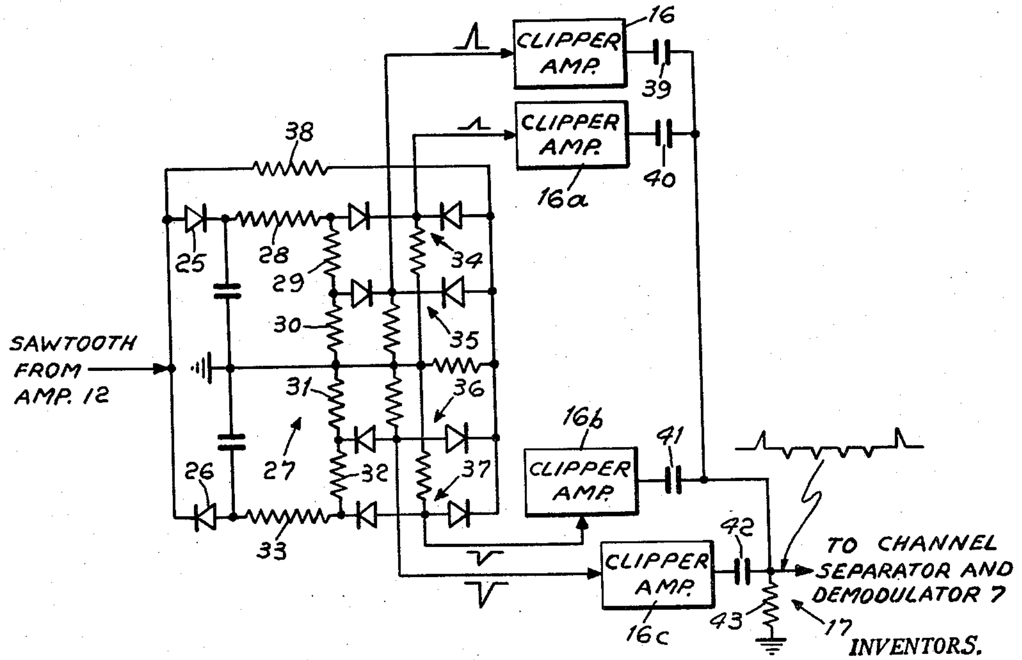
FIG. 3 is a schematic diagram partially in block form of one of the divider and comparator circuits of FIG. 2.
Figure 4:
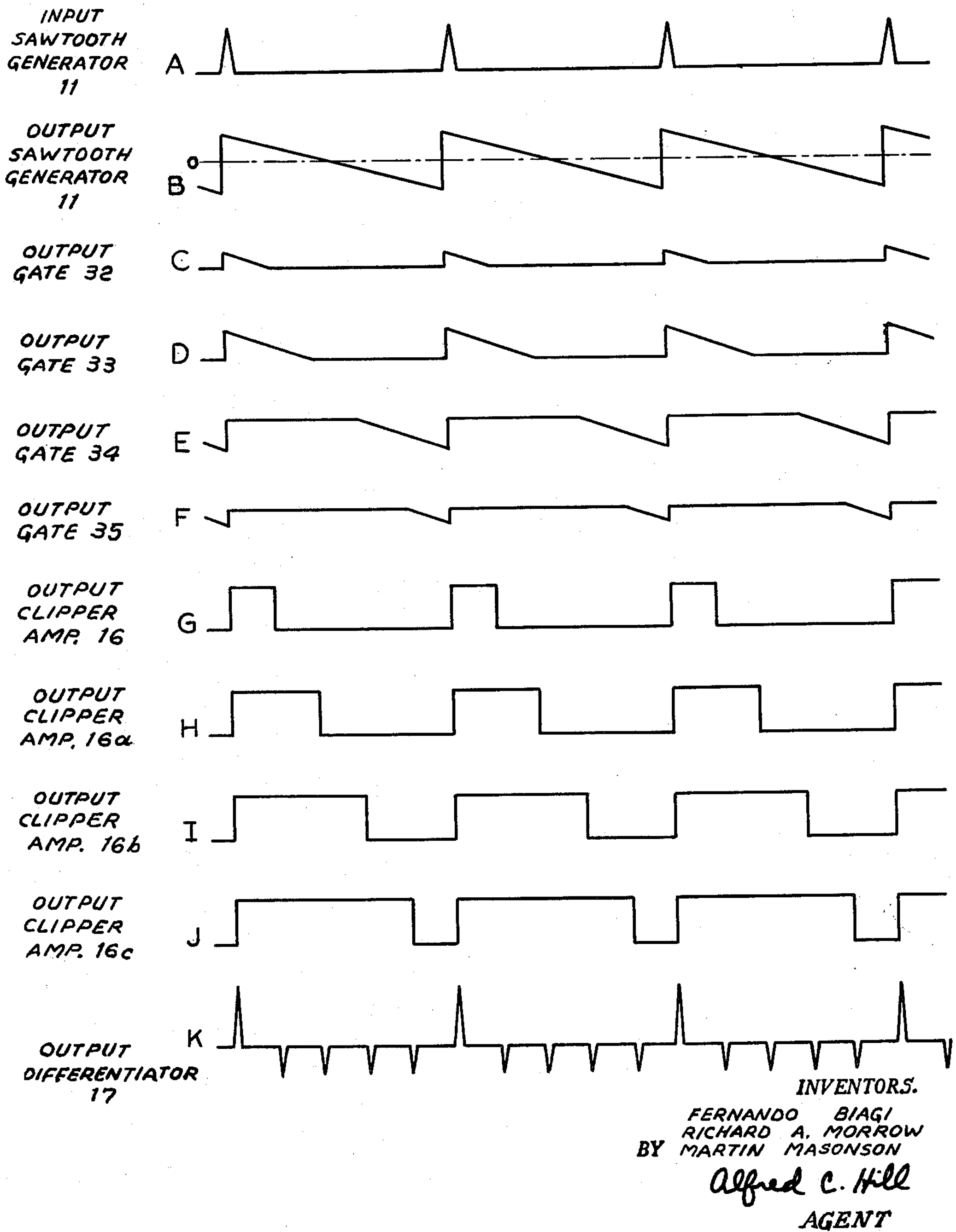
FIG. 4 is a timing diagram useful in explaining the operation of the circuit of FIG. 3.

Referring to FIGS. 3 and 4, an example of divider and comparator circuits 15 will be illustrated and its operation described to carry out the dividing of the sawtooth signal into equal time segments and operating upon these equal time segments to produce the channel signals. Considering a condition where there are four channel signals present in a frame period the circuit operates as follows. The synchronizing signals as detected in detector 8 of FIG. 2 are coupled to the input of sawtooth generator 11 and have the form illustrated in curve A, FIG. 4 to produce a sawtooth signal output as illustrated in curve B, FIG. 4. This sawtooth signal is coupled through amplifier 12, FIG. 2 and hence to diodes 25 and 26 operating as positive and negative peak detectors, respectively, to provide a voltage equal to the amplitude of the sawtooth signal above and below the symmetrical zero reference axis. The detected voltages of diodes 25 and 26 are coupled to voltage dividers 27 including resistors 28, 29, 30, 31, 32 and 33. The action of voltage divider 27 is to divide the output of diodes 25 and 26 to thereby provide four bias potentials, two positive with respect to the zero or ground potential and two negative with respect to the same reference point. These bias potentials are coupled to appropriate ones of gates 34, 35, 36 and 37 each being in the form of a diode "AND" gate. The input from amplifier 12 is coupled through resistor 38 to the other input of "AND" gates 34, 35, 36 and 37. With this arrangement the gates 34, 35, 36 and 37 are nonconductive until the voltage of the sawtooth signal reaches the bias voltage impressed thereon from voltage divider 27 resulting in no output. When the amplitude of the sawtooth signal exceeds the voltage applied from voltage divider 27, the diodes will conduct and provide the outputs as indicated in FIG. 3 and in curves C, D, E and F, FIG. 4. For instance, gate 35 has a small portion in the order of 1/5.4, the output of diode 25 applied thereto. Thus, when the sawtooth signal reaches this value the diodes will conduct and will pass to clipper 16 that portion of the sawtooth signal illustrated in curve D. As the sawtooth signal continues to rise the bias present on gate 34 will be exceeded, the diodes will conduct and that portion of the sawtooth signal illustrated in curve C, FIG. 4 will be conducted to clipper amplifier 16*a*. The operation of gates 36 and 37 will be similar as that explained hereinabove for gates 34 and 35 and will result in the curves illustrated in curves E and F, FIG. 4.

Clipper amplifiers 16 operates upon the signal illustrated in curves C to F, FIG. 4 to produce the square wave outputs illustrated in curves G to J, FIG. 4. It will be observed that in the resultant square wave signals the trailing edge of the positive pulses are equally spaced one from the other and it is this edge which when differentiated produces the desired train of equally spaced pulses.

Thus, condensers 39, 40, 41 and 42 together with the common resistor 43 provide differentiator 17 which will operate upon the waveforms of curves G to J, FIG. 4 to produce the output signal illustrated in FIG. 3 and in curve K, FIG. 4. It will be observed that the output of differentiator 17, the signal present across resistor 43, includes a positive pulse which is the summation of the differentiation that takes place on the leading edge of the positive pulses of the square wave signals of curves G to J, FIG. 4, while the negative pulses are the reference signal for the channel signals and are produced by the negative going trailing edge of the positive waves of the square wave signals of curves G to J. These resultant signals are then sent to channel separator and demodulator 7 to achieve the desired routing and recovery of the channel signals in the multiplex communication system.

While we have described above the principles of our invention in connection with specific apparatus, it is to be clearly understood that this description is made only by way of example and not as a limitation to the scope of our invention as set forth in the objects thereof and in the accompanying claims.

We claim:

1. A demodulator for pulse time modulation time division multiplex signals having a variable number of channel signals and a variable frame period defined by adjacent synchronizing pulses comprising a first means responsive to said channel signals to determine the number of said channel signals, a second means responsive to said adjacent synchronizing pulses to determine said frame period, means coupled to the outputs of said first and second means to produce a train of equally spaced pulses, and means responsive to said multiplex signals and said train of pulses to separate and demodulate said channel signals.

2. A demodulator for pulse time modulation time division multiplex signals having a variable number of channel signals and a variable frame period defined by adjacent synchronizing pulses comprising means to count the number of said channel signals, means responsive to said adjacent synchronizing pulses to determine said frame period, means coupled to the outputs of said counting means and said determining means to produce a train of equally spaced pulses, and means responsive to said multiplex signals and said train of pulses to separate and demodulate said channel signals.

3. A demodulator for pulse time modulation time division multiplex signals having a variable number of channel signals and a variable frame period defined by adjacent synchronizing pulses comprising means to count the number of said channel signals, means responsive to said adjacent synchronizing pulses to measure said frame period, means coupled to the outputs of said counting means and said measuring means to produce a train of equally spaced channel gate pulses, and means responsive to said multiplex signals and said train of gate pulses to separate and demodulate said channel signals.

4. A demodulator for pulse time modulation time division multiplex signals having a variable number of channel signals and a variable frame period defined by synchronizing signals comprising a first means to determine a first quantity proportional to the number of channels, a second means responsive to said synchronizing signals to determine a second quantity proportional to the frame period, means to divide said second quantity by said first quantity to produce a train of equally spaced pulses, and means responsive to said multiplex signals and said train of pulses to separate and demodulate said channel signals.

5. A demodulator for pulse time modulation time division multiplex signals having a variable number of channel signals and a variable frame period defined by synchronizing signals comprising means to count said channels to provide a first quantity proportional to the number of said channel signals, means responsive to said synchronizing signals to determine a second quantity proportional to the frame period, means to divide said second quantity by said first quantity to produce a train of equally spaced pulses, and means responsive to said multiplex signals and said train of pulses to separate and demodulate said channel signals.

6. A demodulator for pulse time modulation time division multiplex signals having a variable number of channel signals and a variable frame period defined by synchronizing signals comprising means to count said channels to provide a first quantity proportional to the number of said channel signals, means responsive to said synchronizing signals to measure said frame period to provide a second quantity proportional to the length of said frame period, means to divide said second quantity by said first quantity to produce a train of equally spaced pulses, and means responsive to said multiplex signals and said train of pulses to separate and demodulate said channel signals.

7. A demodulator for pulse time modulation time division multiplex signals having synchronizing signals defining a variable frame period between adjacent ones thereof and a variable number of channel signals in said frame period comprising means responsive to said channel signals to determine the number of said channel signals, a sawtooth generator responsive to said synchronizing signals to produce a sawtooth signal having a duration equal to said frame period, means responsive to said sawtooth signal and the output signal of said determining means to produce a train of equally spaced pulses, and means responsive to said multiplex signals and said train of pulses to separate and demodulate said channel signals.

8. A demodulator for pulse time modulation time division multiplex signals having synchronizing signals defining a variable frame period between adjacent ones thereof and a variable number of channel signals in said frame period comprising means to count said channel signals to provide an output signal proportional to the number of said channel signals, a sawtooth generator responsive to said synchronizing signals to produce a sawtooth signal having a duration equal to said frame period, means responsive to said sawtooth signal and said output signal to produce a train of equally spaced pulses, and means responsive to said multiplex signals and said train of pulses to separate and demodulate said channel signals.

9. A demodulator for pulse time modulation time division multiplex signals having synchronizing signals defining a variable frame period between adjacent ones thereof and a variable number of channel signals in said frame period comprising means to count said channel signals to provide an output signal proportional to the number of said channel signals, a sawtooth generator responsive to said synchronizing signals to produce a sawtooth signal having a duration equal to said frame period, means responsive to said sawtooth signal and said output signal to divide said sawtooth signal into equal time segments, means responsive to said time segments to produce a train of equally spaced pulses and means responsive to said multiplex signals and said train of pulses to separate and demodulate said channel signals.

10. A demodulator for pulse time modulation time division multiplex signals having synchronizing signals defining a variable frame period between adjacent ones thereof and a variable number of channel signals in said frame period comprising means to count said channel signals to provide an output signal proportional to the number of said channel signals, a sawtooth generator responsive to said synchronizing signals to produce a sawtooth signal having a duration equal to said frame period, a plurality of divider networks each providing a different number of output signals, means responsive to the output signal of said counting means to couple said sawtooth signal to the one of said divider networks having the number of output signals equal to the number of said channel signals, means responsive to the output signals of said one of said divider networks to produce a train of equally spaced pulses, and means responsive to said multiplex signals and said train of pulses to separate and demodulate said channel signals.

11. A demodulator for pulse time modulation time division multiplex signals having synchronizing signals defining a variable frame period between adjacent ones thereof and a variable number of channel signals in said frame period comprising means to count said channel signals to provide an output signal proportional to the number of said channel signals, a sawtooth generator responsive to said synchronizing signals to produce a sawtooth signal having a duration equal to said frame period, a plurality of voltage dividers each providing a different number of output signals, means responsive to the output signal of said counting means to couple said sawtooth signal to the one of said dividers having the number of output signals equal to the number of said channel signals, a comparator circuit coupled to each output of said one of said dividers and the output of said sawtooth generator to divide said sawtooth signal into equal time segments, means coupled to the output of each of said comparator circuits to produce pulses from said time segments, differentiator means responsive to the pulses of said pulse producing means to produce a train of equally spaced pulses, and means responsive to said multiplex signals and said train of pulses to separate and demodulate said channel signals.

12. A demodulator for pulse time modulation time division multiplex signals having synchronizing signals defining a variable frame period between adjacent ones thereof and a variable number of channel signals in said frame period comprising means to count said channel signals to provide an output signal proportional to the number of said channel signals, a sawtooth generator responsive to said synchronizing signals to produce a sawtooth signal having a duration equal to said frame period and symmetrically disposed with respect to a zero axis, a plurality of voltage dividers each providing a different number of output signals, means responsive to said sawtooth signal to detect the peak positive and negative voltage thereof, means responsive to the output signal of said counting means to couple said detected positive and negative voltages to the one of said dividers having the number of output signals equal to the number of said channel signals, a comparator circuit coupled to each output of said one of said dividers and the output of said sawtooth generator to divide said sawtooth signal into equal time segments, means coupled to the output of each of said comparator circuits to produce pulses from said time segments, differentiator means responsive to the pulses of said pulse producing means to produce a train of equally spaced pulses, and means responsive to said multiplex signals and said train of pulses to separate and demodulate said channel signals.

13. A demodulator for pulse time modulation time division multiplex signals having synchronizing signals defining a variable frame period between adjacent ones thereof and a variable number of channel signals in said frame period comprising means to count said channel signals to provide an output signal proportional to the number of said channel signals, a sawtooth generator responsive to said synchronizing signals to produce a sawtooth signal having a duration equal to said frame period and symmetrically disposed with respect to a zero axis, a plurality of voltage dividers each providing a different number of output signals, means responsive to said sawtooth signal to detect the peak positive and negative voltages thereof, means responsive to the output signal of said counting means to couple said positive and negative voltages to the one of said dividers having the number of output signals equal to the number of said channel signals, a comparator circuit coupled to each output of said one of said dividers and the output of said sawtooth generator to pass equal time segments of said sawtooth signal, means to produce square pulses from said time segments having a duration and polarity equal to the duration and polarity of said time segments, differentiator means responsive to the trailing edges of said square pulses to produce a train of equally spaced pulses, and means responsive to said multiplex signals and said train of pulses to separate and demodulate said channel signals.

14. A receiver for pulse time modulation time division multiplex signals comprising means for receiving signals including a variable number of channel signals having a variable frame period defined by adjacent synchronizing pulses, a first means responsive to said channel signals to determine the number of said channel signals, a second means responsive to said adjacent synchronizing pulses to determine said frame period, means coupled to the outputs of said first and second determining means to produce a train of equally spaced pulses, and means responsive to the signals of said source of signals and said train of pulses to separate and demodulate said channel signals.

15. A receiver for pulse time modulation time division multiplex signals comprising means for receiving signals including a variable number of channel signals having a variable frame period defined by synchronizing signals, a first means to determine a first quantity proportional to the number of channels, a second means responsive to said synchronizing signals to determine a second quantity proportional to said frame period, means to divide said second quantity by said first quantity to produce a train of equally spaced pulses, and means responsive to said multiplex signals and said train of pulses to separate and demodulate said channel signals.

16. A receiver for pulse time modulation time division multiplex signals comprising means for receiving signals including synchronizing signals defining a variable frame period between adjacent ones thereof and a variable number of channel signals in said frame period, means responsive to said channel signals to determine the number of said channel signals, a sawtooth generator responsive to said synchronizing signals to produce a sawtooth signal having a duration equal to said frame period, means responsive to said sawtooth signal and the output signal of said determining means to produce a train of equally spaced pulses, and means responsive to said multiplex signals and said train of pulses to separate and demodulate said channel signals.

17. A receiver for pulse time modulation time division multiplex signals comprising means for receiving signals including synchronzing signals defining a variable frame period between adjacent ones thereof and a variable number of channel signals in said frame period, means to count said channel signals to provide an output signal proportional to the number of said channel signals, a sawtooth generator responsive to said synchronizing signals to produce a sawtooth signal having a duration equal to said frame period, means responsive to said sawtooth signal and said output signal to divide said sawtooth signal into equal time segments equal in number to said channel signals, means responsive to said time segments to produce a train of equally spaced pulses, and means responsive to said multiplex signals and said train of pulses to separate and demodulate said channel signals.

18. A communication system comprising means to generate a time division multiplex signal including synchronizing signals defining a controllable frame period between adjacent ones thereof and a controllable number of pulse time modulation channel signals in said frame period, means to arbitrarily control said frame period and the number of said channel signals, a first means at a point remote from said generating means to determine the number of said controlled channel signals, a second means disposed at said remote point responsive to said synchronizing signals to determine said controlled frame period, means coupled to said first and second determining means to produce a train of equally spaced pulses, and means responsive to said controlled channel signals and said train of pulses to separate and demodulate said controlled channel signals.

19. A communication system comprising a means to generate a time division multiplex signal including synchronizing signals defining a controllable frame period between adjacent ones thereof and a controllable number of pulse time modulation channel signals in said frame period, means to arbitrarily control the number of said channel signals and said frame period, means disposed at a point remote from said generating means to count said controlled channel signals to provide an output signal proportional to the number of said controlled channel signals, a sawtooth generator disposed at said remote point responsive to said synchronizing signals to produce a sawtooth signal having a duration equal to said controlled frame period, means responsive to said sawtooth signal and said output signal to produce a train of equally spaced pulses, and means responsive to said controlled channel signals and said train of pulses to separate and demodulate said controlled channel signals.

20. A communication system comprising means to generate a plurality of pulse trains, each of said pulse trains having a number of channel signals different from the others of said pulse trains and a variable frame period defined by synchronizing signals, means to arbitrarily change the pulse train transmitted and the frame period of said transmitted pulse train, means responsive to said transmitted pulse train to produce a train of channel gate pulses for demodulation of the channel signals present in said transmitted pulse train including a first means to determine the number of the channel signals present in said transmitted pulse train, a second means responsive to said synchronizing signals to determine the frame period of said transmitted pulse train, and means coupled to said first and second means to produce said train of gate pulses, and means responsive to said transmitted pulse train and said train of gate pulses to separate and demodulate said channel signals.

References Cited in the file of this patent

UNITED STATES PATENTS

| | | |
|---|---|---|
| 2,277,192 | Wilson | Mar. 24, 1942 |
| 2,517,579 | Levy | Aug. 8, 1950 |
| 2,527,649 | Peterson | Oct. 31, 1950 |
| 2,771,553 | Metzger | Nov. 20, 1956 |